United States Patent
Xu et al.

(10) Patent No.: US 9,215,628 B2
(45) Date of Patent: Dec. 15, 2015

(54) METHOD FOR PROCESSING RADIO LINK FAILURE REPORT AND METHOD FOR ADJUSTING MOBILE PARAMETER

(75) Inventors: Lixiang Xu, Beijing (CN); Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 1410 days.

(21) Appl. No.: 12/892,072

(22) Filed: Sep. 28, 2010

(65) Prior Publication Data

US 2011/0077010 A1    Mar. 31, 2011

(30) Foreign Application Priority Data

Sep. 29, 2009   (CN) .......................... 2009 1 0178593

(51) Int. Cl.
 *H04W 36/00*   (2009.01)
 *H04W 24/00*   (2009.01)
(52) U.S. Cl.
 CPC .......... *H04W 36/0033* (2013.01); *H04W 24/00* (2013.01)
(58) Field of Classification Search
 CPC ............ H04W 36/0083; H04W 24/00; H04W 36/0033; H04W 28/04
 See application file for complete search history.

(56) References Cited

U.S. PATENT DOCUMENTS

| 2009/0061878 | A1* | 3/2009 | Fischer ......................... 455/436 |
| 2009/0196168 | A1  | 8/2009 | Aydin et al. |
| 2009/0316655 | A1* | 12/2009 | Prakash et al. ................ 370/331 |
| 2010/0173633 | A1* | 7/2010 | Catovic et al. ................ 455/436 |
| 2010/0278037 | A1* | 11/2010 | Jen et al. ....................... 370/216 |

FOREIGN PATENT DOCUMENTS

| CN | 101400088 A | 4/2009 |
| CN | 101505508 A | 8/2009 |
| EP | 1 903 821 A2 | 3/2008 |
| EP | 2 086 253 A1 | 8/2009 |
| WO | 2008-087524 A2 | 7/2008 |

OTHER PUBLICATIONS

3GPP; "3rd Generation Partnership Project; Technical Specification Group Services and System Aspects; 3GPP System Architecture Evolution (SAE): Security architecture; (Release 9)"; 3GPP Standard; 3GPP TS 33.401, V9.0.0; XP050376849; Jun. 2009, France.

* cited by examiner

*Primary Examiner* — Fanghwa Wang
(74) *Attorney, Agent, or Firm* — Jefferson IP Law, LLP

(57) ABSTRACT

A method and a system for processing a Radio Link Failure (RLF) report, where when a User Equipment (UE) encounters an RLF in a first cell controlled by a first evolved base station and selects a second cell controlled by a second evolved base station to re-establish an Radio Resource Connection (RRC), are provided. The method includes sending, by the second evolved base station, the RLF report to every corresponding evolved base station according to the PCI of the first cell having been received from the UE, where the PCI of the first cell, the PCI of a second cell, the CRNTI of the UE in the first cell, and UE authentication information are carried in the RLF report, and authenticating, by every evolved base station the UE according to the UE authentication information. Another method for processing an RLF report, and two methods for adjusting a mobile parameter, are also provided.

17 Claims, 4 Drawing Sheets

METHOD FOR PROCESSING RADIO LINK FAILURE REPORT AND METHOD FOR ADJUSTING MOBILE PARAMETER

PRIORITY

This application claims the benefit under 35 U.S.C. §119(a) of a Chinese patent application filed on Sep. 29, 2009 in the Chinese Intellectual Property Office and assigned Serial No. 200910178593.X, the entire disclosure of which is hereby incorporated by reference.

BACKGROUND OF THE INVENTION

1. Field of the Invention

The present invention relates to the field of communication technologies. More particularly, the present invention relates to a method for processing a Radio Link Failure report and a method for adjusting a mobile parameter.

2. Background of the Invention

System Architecture Evolution (SAE) is an evolved system structure proposed by the $3^{rd}$ Generation Partnership Project (3GPP). At an initial stage of network deployment or during operation of a whole mobile network, a large amount of human labor is required for configuring and optimizing a network parameter (particularly for setting a radio parameter), so as to ensure a favorable coverage and capacity, mobile robustness, load balance in mobility, access rate of user equipment, etc. Therefore, a Self-Optimization Network (SON) requirement is proposed in the SAE system. A self-optimization architecture according to the related art is as illustrated in FIG. 1.

After being powered up, an evolved base station (evolved Node B, eNB) begins a self-configuration process. As illustrated in FIG. 1, the self-configuration includes: (A) Basic settings and (B) Initial radio parameter configuration. Specifically:

(A) Basic settings include: a-1~a-4 and the like as illustrated in FIG. 1, in which:

a-1 denotes configuring an IP address for the eNB and detecting an Operation, Administration and Maintenance (OAM);

a-2 denotes authentication between the eNB and the network;

a-3 denotes, for a home base station, finding a corresponding gateway; and a-4 denotes downloading the operation parameter and software of the eNB.

(B) initial radio parameter configuration includes: b-1~b-2 and the like as illustrated in FIG. 1, in which:

b-1 denotes configuring a neighbor cell list; and b-2 denotes configuring a coverage capacity related parameter.

The above self-configuration is performed according to ideal scenarios such as experience, simulation, and the like. Actual network performance may vary depending on influences of buildings, climates, surrounding environments, etc. Therefore, after the self-configuration is completed, the configuration of many parameters is probably not optimal. In order to gain better performance for the network so as to meet the requirements of operators and users, the optimization process of the network is very important. At present, self-optimization having relatively great importance includes: the self-optimization of the neighbor cell list, the self-optimization of the coverage and capacity, the self-optimization of the mobile robustness, the self-optimization of the load balance, the self-optimization of a Random Access Channel (RACH) parameter, power saving, interference reduction, etc. Specifically, the interference reduction may be a part of the self-optimization of the coverage and capacity. In FIG. 1, (C) only illustrates a portion of self-optimization operations by taking "c-1: The self-optimization of the neighbor cell list," and, "c-2: The self-optimization of the coverage and capacity," as examples.

In the self-optimization of the mobile robustness, the most important issue is the way to determine if handover is too late or too early. In the self-optimization of the coverage and capacity, another relatively important issue is to determine whether a coverage hole exists.

In existing methods for determining too late handover, determining too early handover, and determining if a coverage hole exists, the following operation is common. When a User Equipment (UE) encounters Radio Link Failure (RLF) in a cell 1 controlled by an eNB1 and selects a cell 2 controlled by an eNB2 to re-establish a Radio Resource Connection (RRC), the UE sends an RRC re-establishment request message to the eNB2. The Physical Cell Identifier (PCI) of the cell 1, the Cell Radio Network Temporary Identifier (CRNTI) of the UE in the cell 1, and the short information of Media Access Control used for data Integrity of signaling messages (short MAC-I) are carried in the RRC re-establishment request message. The eNB2 determines the base station (i.e., the eNB1) that controls the cell corresponding to the PCI according to the PCI, and sends an RLF report to the eNB1. The CRNTI of the UE in the cell 1, the PCI of the cell 1, and the PCI of the cell 2 are carried in the RLF report.

After receiving the RLF report, the eNB1 based thereon determines whether too late handover and/or too early handover have occurred, or determines whether a coverage hole exists.

The operation in common for the above three methods actually relates to a processing manner for the RLF report. The above existing processing manner for the RLF report has a problem in that, after the eNB2 receives the RRC re-establishment request message from the UE, if there are two or more adjacent cells (e.g. controlled by the eNB1 and an eNB3, respectively) having the same PCI, the eNB2 may be incapable of determining the eNB to which the RLF report should be sent. In case of erroneous sending, the eNB may be caused to make a wrong determination, thus leading to an adverse influence on network performance. This problem also occurs in other processes that need to perform the self-optimization based on the RLF report.

The self-optimization of the mobile load balance seeks to ensure the load balance between adjacent cells or between cells having overlapped coverage, or to transfer a part of the load contained in a congested cell to an adjacent cell or a cell having overlapped coverage. This may be implemented by switching the UE or by adjusting the mobile parameter. The mobile parameter includes a cell switching parameter and a cell re-selection parameter. In order to avoid a ping-pong effect resulting from UE switching, a cell needs to negotiate with the adjacent cell when adjusting its mobile parameter. How to ensure a cell adjusts the mobile parameter with all its adjacent cells in a harmonious manner is a problem to be addressed at present.

The occurrence of the above problem causes degradation of the self-optimization effect, and the network performance cannot be ensured effectively.

Therefore, a need exists for a method and system for processing an RLF report and for adjusting a mobile parameter, so as to enhance the self-optimization effect, thus to improve network performance.

SUMMARY OF THE INVENTION

An aspect of the present invention is to address at least the above-mentioned problems and/or disadvantages and to provide at least the advantages described below. Accordingly, an aspect of the present invention is to provide a method for processing a Radio Link Failure (RLF) report, so as to enhance the self-optimization effect, thus to improve the network performance.

Another object of the present invention is to provide a method for adjusting a mobile parameter, so as to enhance the self-optimization effect, thus to improve the network performance.

In accordance with an aspect of the present invention, a method for processing an RLF report when a User Equipment (UE) encounters an RLF in a first cell controlled by a first evolved base station and selects a second cell controlled by a second evolved base station to re-establish a Radio Resource Connection (RRC), is provided. The method includes receiving, by the second evolved base station, an RRC re-establishment request message sent from the UE, wherein a Physical Cell Identifier (PCI) of the first cell, a Cell Radio Network Temporary Identifier (CRNTI) of the UE in the first cell, and short information of Media Access Control used for data Integrity of signaling messages (short MAC-I) are carried in the RRC re-establishment request message, sending, by the second evolved base station, the RLF report to every evolved base station that respectively controls a corresponding cell, according to the PCI of the first cell, wherein the PCI of the first cell, the CRNTI of the UE in the first cell, and UE authentication information used for authenticating the UE are carried in the RLF report, and authenticating, by every evolved base station that receives the RLF report, the UE according to the UE authentication information carried in the RLF report.

In accordance with another aspect of the present invention, a method for processing a Radio Link Failure RLF report, when a User Equipment UE encounters an RLF in a first cell controlled by a first evolved base station and selects a second cell controlled by a second evolved base station to re-establish a Radio Resource Connection RRC, is provided. The method includes receiving, by the second evolved base station, information sent from the UE including a PCI of the first cell, a CRNTI of the UE in the first cell, short MAC-I, and cell first authentication information used for authenticating a cell, and sending, by the second evolved base station, the RLF report to an evolved base station that controls the corresponding cell, according to the cell first authentication information.

In accordance with yet another aspect of the present invention, a method for adjusting a mobile parameter, when a first evolved base station which determines to adjust the mobile parameter of its controlled cell, is provided. The method includes sending, by the first evolved base station, a mobile parameter adjustment request message to every evolved base station that controls a respective one of all cells subjected to the adjustment, wherein the adjusted mobile parameter is carried in the mobile parameter adjustment request message; receiving, by the first evolved base station, a mobile parameter adjustment acceptance message or a mobile parameter adjustment refusal message returned from each evolved base station, if each of the evolved base station returns the mobile parameter adjustment acceptance message, then adjusting, by the first evolved base station, the mobile parameter, and sending a mobile parameter adjustment acknowledgement message to every evolved base station, and, if at least one of the evolved base station returns the mobile parameter adjustment refusal message, then not adjusting, by the first evolved base station, the mobile parameter, and sending a mobile parameter adjustment cancellation message to every evolved base station.

In accordance with an aspect of the present invention, a method for adjusting a mobile parameter, when a first evolved base station determines to adjust the mobile parameter of its controlled cell, is provided. The method includes receiving, by every evolved base station that controls a respective one of all cells subjected to the adjustment, a mobile parameter adjustment request message from the first evolved base station, wherein the adjusted mobile parameter is carried in the mobile parameter adjustment request message, determining, by every evolved base station respectively, whether the adjustment is accepted, and if so, returning a mobile parameter adjustment acceptance message to the first evolved base station, and, if not, returning a mobile parameter adjustment refusal message to the first evolved base station, if receiving a mobile parameter adjustment acknowledgement message from the first evolved base station, then replacing, by every evolved base station respectively, the parameter related to the mobile parameter of the controlled cell of the first evolved base station that is stored currently by the adjusted mobile parameter, and, if receiving a mobile parameter adjustment cancellation message from the first evolved base station, then retaining unchanged, by every evolved base station, the parameter related to the mobile parameter of the controlled cell of the first evolved base station that is stored currently.

As can be seen from the above technical solution, in an exemplary method for processing an RLF report, when the UE encounters the RLF in the first cell controlled by the first evolved base station and selects the second cell controlled by the second evolved base station to re-establish a radio link, the authentication is performed for the UE or the cell in which the UE encounters the RLF by sending the authentication information. Thus, even when there are two or more adjacent cells having the same PCI, the cell in which the UE encounters the RLF can be determined correctly, thus enhancing the self-optimization effect, and improving the network performance.

In the exemplary method for adjusting a mobile parameter, the evolved base station that initiates the mobile parameter adjustment performs determination in a collective manner according to the message returned from every relative evolved base station that indicates accepting or refusing the mobile parameter adjustment, and sends the message that indicates adjusting or not the related mobile parameter to every relative evolved base station in a collective manner according to the result of the determination. Finally, all evolved base stations adjust or not the related mobile parameter, thus avoiding the problem that the mobile parameters stored in respective evolved base stations are inconsistent with each other, ensuring that a cell adjusts the mobile parameter with all its adjacent cells in a harmonious manner, enhancing the self-optimization effect, and improving the network performance.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention proposes a method for processing a Radio Link Failure (RLF) report and a method for adjusting a mobile parameter with respect to the problem presented in the existing self-optimization process.

In an exemplary implementation, when a User Equipment (UE) encounters the RLF in the first cell controlled by the evolved base station and selects the second cell controlled by the second evolved base station to re-establish a radio link, the authentication is performed for the UE or the cell in which the UE encounters the RLF by sending the authentication information. Thus, even when there are two or more neighbor cells having the same Physical Cell Identifier (PCI), the cell in which the UE encounters the RLF can be determined correctly, thus enhancing the self-optimization effect, and improving the network performance.

Exemplary embodiments of the present invention include two methods for processing an RLF report, which are respectively described in more detail below with reference to the accompanying drawings.

Figure 1:
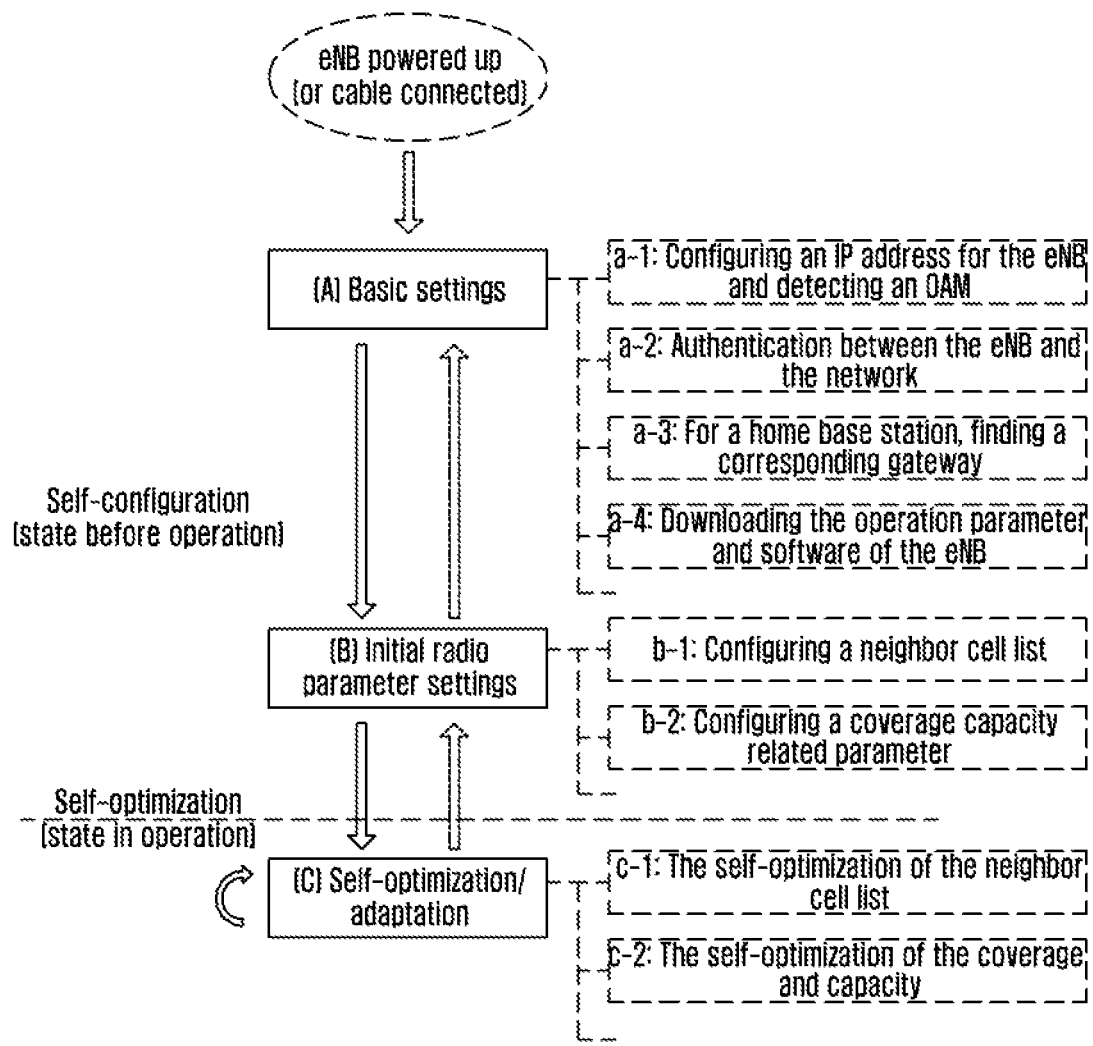
FIG. 1 is a schematic diagram illustrating a basic self-optimization architecture in an existing System Architecture Evolution (SAE) system according to the related art.
Figure 2:
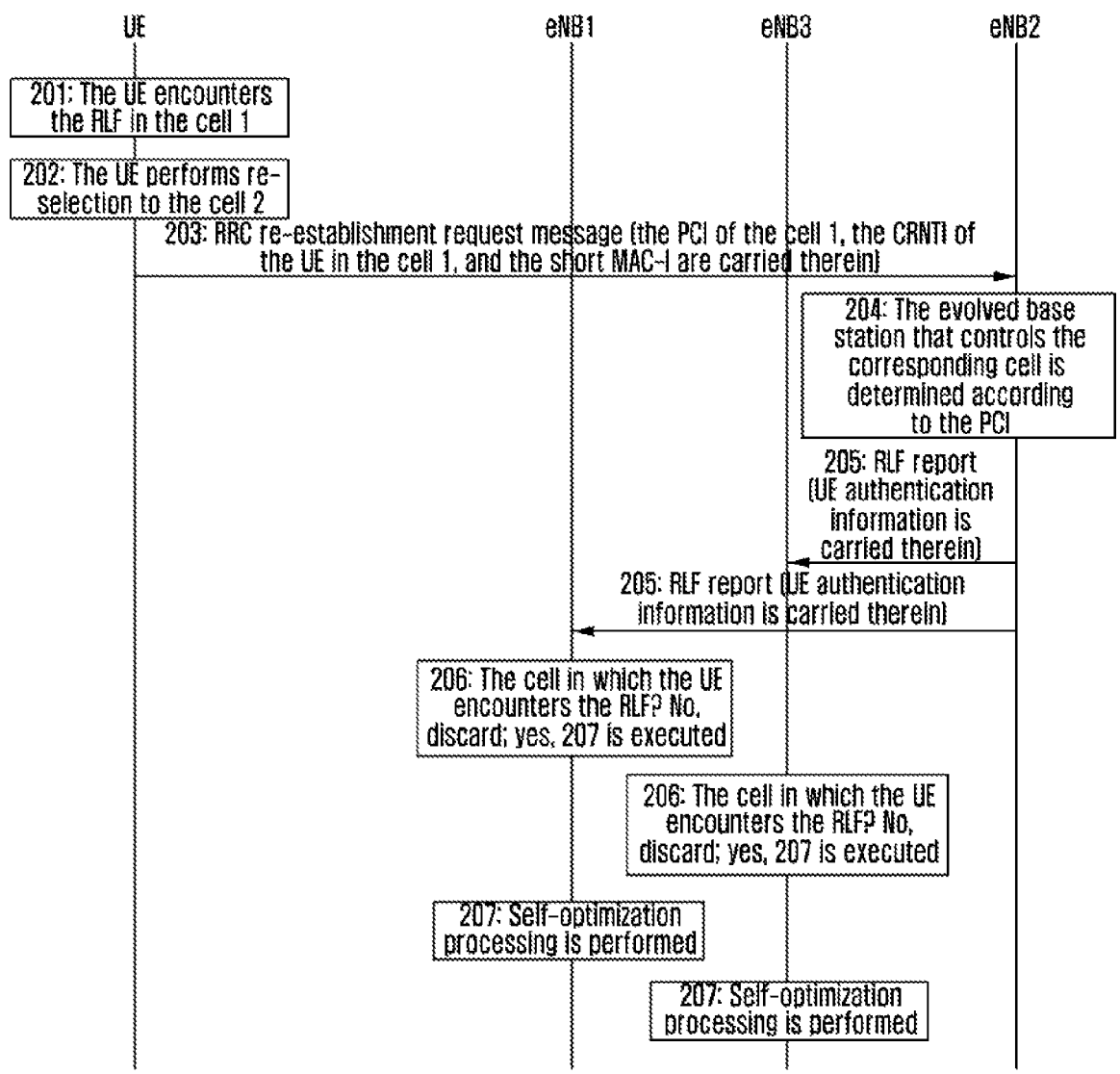
FIG. 2 is a schematic diagram illustrating a method for processing a Radio Link Failure (RLF) report according to an exemplary embodiment of the present invention.

FIG. 2 is a schematic diagram illustrating a method for processing an RLF report according to an exemplary embodiment of the present invention.

Referring to FIG. 2, an exemplary method includes the following process.

In step 201, the UE encounters the RLF in the cell 1, assuming for this example that the cell 1 is controlled by evolved base station (evolved Node B, eNB)1.

In step 202, the UE performs cell re-selection, and selects the cell 2 to re-establish the Radio Resource Connection (RRC), assuming for this example that the cell 2 is controlled by eNB2.

In step 203, the UE sends an RRC re-establishment request message to the eNB2. The PCI of the cell 1, the Cell Radio Network Temporary Identifier (CRNTI) of the UE in the cell 1, and the short information of Media Access Control used for data Integrity of signaling messages (short MAC-I) are carried in the RRC re-establishment request message.

Here, the short MAC-I is the 16 least significant bits of the MAC-I. The MAC-I is obtained by performing calculation from the PCI of the cell 1, the CRNTI of the UE in the first cell, the identifier ECI of the cell 2, and the security related parameter of the cell 1. Specifically, the ECI is the unique cell identifier of the cell in a Public Land Mobile Network (PLMN). The ECI refers to the Evolved Universal Terrestrial Radio Access Network Cell Identifier (Evolved UTRAN Cell Identifier).

In step 204, the eNB2 determines all cells corresponding to the PCI according to the said PCI, and determines every evolved base station that controls a respective one of all the cells.

As described above, in the neighbor cells of the cell 2, there may be two or more neighbor cells having the same PCI, thus two or more cells may be found according to the said PCI. These cells may be controlled by different evolved base stations. This step seeks to find those evolved base stations. Assume for this example that they are the eNB1 and the eNB3. In the case that only one eNB is found, the method of the present invention is also applicable.

In step 205, the eNB2 sends an RLF report to every evolved base station determined in step 204. In addition to the PCI of the cell 1, the PCI of the cell 2 and the CRNTI of the UE in the cell 1, UE authentication information used for authenticating the UE is also carried in the RLF report.

According to the assumption of step 204, in this step, the eNB2 may send the RLF report to the eNB1 and the eNB3. The PCI of the cell 1 and the CRNTI of the UE in the cell 1 being carried in the RLF report are used for determining the context of the UE, and the UE authentication information carried in the RLF report is used for determining whether the context of the UE is the context of such UE encountering the RLF.

In this step, the UE authentication information being carried in the RLF report can be any information capable of determining whether the context of a certain UE is the context of such UE encountering the RLF, e.g. may be the ECI of the cell 2 as well as the short MAC-I contained in the RRC re-establishment request message received by the cell 2 from the UE, or alternatively, may be the Enhanced Cell Global Identifier (ECGI) of the cell 2 as well as the short MAC-I contained in the RRC re-establishment request message received by the cell 2 from the UE, or alternatively, may be the short MAC-I contained in the RRC re-establishment request message received by the cell 2 from the UE (in this case, the short MAC-I may be combined with the PCI of the cell 2 being contained in the RLF report to perform the authentication for the UE).

In step 206, every evolved base station that receives the RLF report authenticates the UE according to the UE authentication information carried in the RLF report.

More specifically, every evolved base station (which in this example includes the eNB1 and the eNB3) that receives the RLF report may first determine the context of the UE according to the PCI of the first cell and the CRNTI of the UE in the first cell being carried in the RLF report, and determine whether the context of the UE is the context of that UE encountering the RLF according to the UE authentication information. If so, the procedure proceeds to step 207. Otherwise, the message may be discarded without any processing.

In this step, an exemplary method to determine the context of the UE according to the PCI of the cell 1 and the CRNTI of the UE in the first cell may include the following process.

First, every eNB that receives the RLF report finds the corresponding cell according to the PCI.

According to the above description, the cell having the same PCI may be present in different eNBs, and also in the same eNB. Therefore, there may be two or more cells found. Herein, these cells are collectively referred to as a cell x.

Then, the context of the UE is found according to the CRNTI in the cell x.

If finding two or more cells, the eNB that receives the RLF report may also determine whether the context of the corresponding UE is stored in the cell to further determine whether the found cell is the cell in which the UE encounters the RLF.

In this step, exemplary methods of determining whether the context of the UE is the context of that UE encountering the RLF may vary depending on different UE authentication information.

If the UE authentication information is the ECI of the cell 2 and the short MAC-I being contained in the RRC re-establishment request message, the way for determination is as follows: Every eNB that receives the RLF report calculates the MAC-I from the security related parameter of the cell x, as well as the cell 2 identity ECI, the CRNTI of the UE in the first cell, and the PCI of cell 1 being contained in the RLF report. The 16 least significant bits of the MAC-I are compared with the short MAC-I contained in the RLF report. If they are the same as each other, it is determined that the context of the UE having been found is the context of the UE encountering the RLF. Otherwise, it is determined that it is not the context of the UE encountering the RLF.

If the UE authentication information is the ECGI of the cell 2 and the short MAC-I being contained in the RRC re-establishment request message, the way for determination is as follows: Every eNB that receives the RLF report first obtains the ECI of the cell 2 according to the ECGI of the cell 2, and then authenticates whether the context of the UE having been found is the context of the UE encountering the RLF according to the above "short MAC-I+the ECI of the cell 2" manner.

If the UE authentication information is the short MAC-I contained in the RRC re-establishment request message, the way for determination is as follows: Every eNB that receives the RLF report first finds the ECI of the cell 2 from the neighbor cell list according to the PCI of the cell 2 being contained in the RLF report, and then authenticates whether the context of the UE having been found is the context of the UE encountering the RLF according to the above "short MAC-I+the ECI of the cell 2" manner.

Based on the determination of this step, whether the cell controlled by this evolved base station is the cell in which the UE encounters the RLF may be determined. At this time, the eNB1 may execute step 207.

In step 207, the eNB1 performs corresponding self-optimization processing according to the RLF report.

In this step, the eNB1 may determine the reason of the RLF according to the RLF report and other corresponding information, and determine based on this whether the too early handover, the too late handover, the coverage hole, and the like are presented. Since the subsequent operation for performing self-optimization processing is not an essential point for the present invention, the description thereof is omitted herein, and only a brief description is provided below.

Regarding the method of determining the too early handover, the eNB where the UE encounters the RLF may determine whether a UE context release request message is sent to the cell 2 controlled by the eNB2 to release the context of the UE within a certain time. If so, the eNB determines that the too early handover was performed, and thus sends a too early handover indication to the eNB2.

In order to assist the network in determining either too late handover or the coverage hole, the UE needs to report other information to the network. For example, the UE reports the position of the UE at the time that the RLF is presented, as well as the measurement result of other neighbor cells, to the eNB2. These may be reported through the RRC re-establishment request message or an RRC re-establishment completion message or another RRC message. Thus, the eNB where the UE encounters the RLF may determine either too late handover or the coverage hole, according to the position at the time that the RLF is presented, as well as the measurement result from the UE. For example, if the signal of the cell 1 has been very weak, and the signal of the cell 2 is sufficiently strong when the UE encounters the RLF, the determination at this time should result in the too late handover. If the signals of both the cell 1 and the cell 2 are very weak when the UE encounters the RLF, the determination may be the coverage hole.

At this point, the method for processing the RLF report according to the first exemplary embodiment of the present invention is completed.

Figure 3:
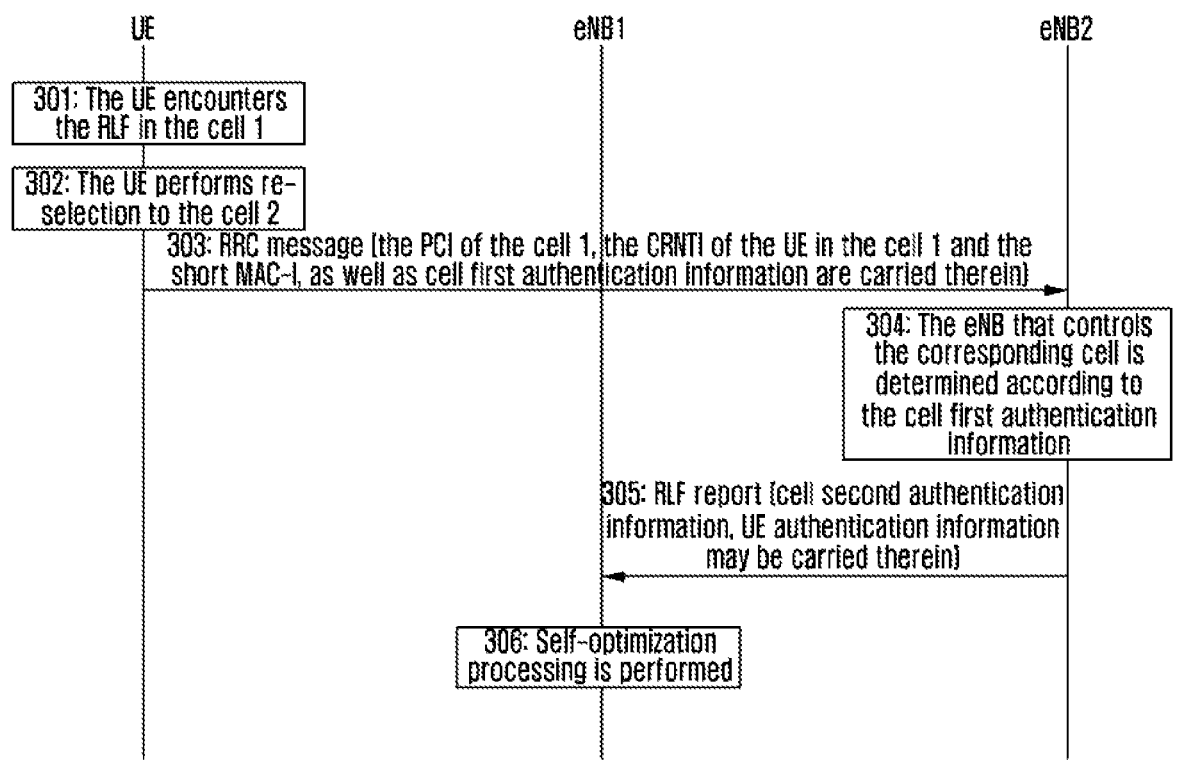
FIG. 3 is a schematic diagram illustrating a method for processing an RLF report according to an exemplary embodiment of the present invention.

FIG. 3 is a schematic diagram illustrating a method for processing an RLF report according to an exemplary embodiment of the present invention.

Referring to FIG. 3, an exemplary method includes the following process.

In step 301, the UE encounters the RLF in the cell 1, assuming for this example that the cell 1 is controlled by the eNB1.

In step 302, the UE performs cell re-selection, and selects the cell 2 to re-establish the RRC, assuming for this example that the cell 2 is controlled by the eNB2.

In step 303, the UE sends the following information to the eNB2: the PCI of the cell 1, the CRNTI of the UE in the cell 1, the short MAC-I, and cell first authentication information used for authenticating the cell.

Here, the information of this step may be carried by the RRC re-establishment request message, the RRC re-establishment completion message, or another RRC message, so as to send the same to the eNB2, in so far as the above information can be carried in the RRC message. The information of this step may be sent from the UE to the eNB2 through one or more RRC messages.

In this step, the cell first authentication information carried in the RRC message may be any information capable of accurately determining whether a certain cell is the cell in which the UE encounters the RLF, e.g., may be the ECGI of the cell 1 and/or the frequency of the cell 1. Specifically, the ECGI may uniquely identify a certain cell. On the basis of a favorable network plan, there is almost never a cell having both the same frequency and the same PCI as another cell. Therefore, the combination of the frequency and the PCI may also uniquely identify a certain cell.

In step 304, the eNB2 determines the corresponding cell according to the cell authentication information.

For example, if the cell authentication information contains the ECGI, the corresponding cell may be uniquely determined according to the ECGI. If the cell authentication information contains the frequency of the cell in which the UE encounters the RLF, on the basis of a favorable network plan, the corresponding cell may be determined according to the PCI and the frequency.

To sum up, in this step, the cell in which the UE encounters the RLF may be uniquely determined according to the cell authentication information.

In step 305, the eNB2 sends the RLF report to the eNB1.

Here, the information carried in the RLF report may be classified into the following cases.

First case: Assuming for this example that the PCI of all cells contained in the eNB1 are different from each other, the cell in which the UE encounters the RLF may be uniquely determined according to the PCI carried in the RLF report. Therefore, the PCI of the cell 1, the PCI of the cell 2, and the CRNTI of the UE in the first cell are carried in the RLF report.

Second case: Assuming for this example that there is a cell having the same PCI as another, this means that the cell in which the UE encounters the RLF cannot be uniquely determined according to the PCI carried in the RLF report. At this time, in addition to the PCI of the cell 1, the PCI of the cell 2 and the CRNTI of the UE in the first cell, second cell authentication information used for authenticating the cell may also be carried in the RLF report, for the eNB1 to determine the cell in which the UE encounters the RLF. The second cell authentication information may include the ECGI of the cell 1 and/or the frequency of the cell 1.

In this case, an exemplary method for the eNB1 to determine the cell in which the UE encounters the RLF according to the information carried in the RLF report may include the following process.

The eNB1 determines the corresponding cell according to the PCI of the cell 1 being carried in the RLF report. If there are two or more cells having the same PCI, the cell in the two or more cells having the same PCI whose ECGI is equal to such ECGI is determined as the cell in which the UE encounters the RLF, or alternatively, the cell in the two or more cells having the same PCI whose frequency is equal to such frequency is determined as the cell in which the UE encounters the RLF.

Alternatively, if the cell second authentication information is the ECGI of the cell 1, the eNB1 that receives the RLF report may directly find the cell in which the UE encounters the RLF according to the ECGI of the cell 1, i.e., the process of finding the cell in which the UE encounters the RLF using the PCI of the cell 1 may be omitted.

Of course, there may be other ways in practical applications, in so far as the cell in which the UE encounters the RLF is found according to the information carried in the RLF report.

Third case: In order to allow the eNB that receives the RLF report to be able to further authenticate the UE, in addition to the PCI of the cell 1, the PCI of the cell 2, and the CRNTI of the UE in the cell 1, UE authentication information used for authenticating the UE may also be carried in the RLF report sent in this step. As in step 205, the PCI of the cell 1 and the CRNTI of the UE in the cell 1 being carried in the RLF report are used for determining the context of the UE, and the UE authentication information carried in the RLF report is used for determining whether the context of the UE is the context of such UE encountering the RLF. Specifically, the UE authentication information may include the following:

The ECI of the cell 2 as well as the short MAC-I having been received by a second evolved base station from the UE.

Alternatively, the ECGI of the cell 2 as well as the short MAC-I having been received by a second evolved base station from the UE.

Alternatively, the short MAC-I having been received by a second evolved base station from the UE.

The way to determine whether the context of the UE is the context of that UE encountering the RLF is the same as the corresponding way for determination as described in step 206 illustrated in FIG. 2, and the description thereof is omitted herein.

In specific implementation, the above three cases may occur simultaneously, i.e. the cell second authentication information and the UE authentication information may be carried at the same time in the RLF report.

In step 306, the eNB1 performs corresponding self-optimization processing according to the RLF report.

In this step, the eNB1 may determine the reason of the RLF according to the RLF report and other corresponding information, and determine based on this whether too early handover, too late handover, the coverage hole, and the like are presented. The subsequent operation for performing self-optimization processing is not an essential point for the present invention and has been described briefly in step 207, thus the description thereof is omitted herein.

At this point, the method for processing the RLF report according to the exemplary embodiment of the present invention is completed.

In addition to the self-optimization support by processing the RLF report, a method for adjusting a mobile parameter is also proposed in the present invention. The method is described in more detail below with reference to the accompanying drawings.

Figure 4:
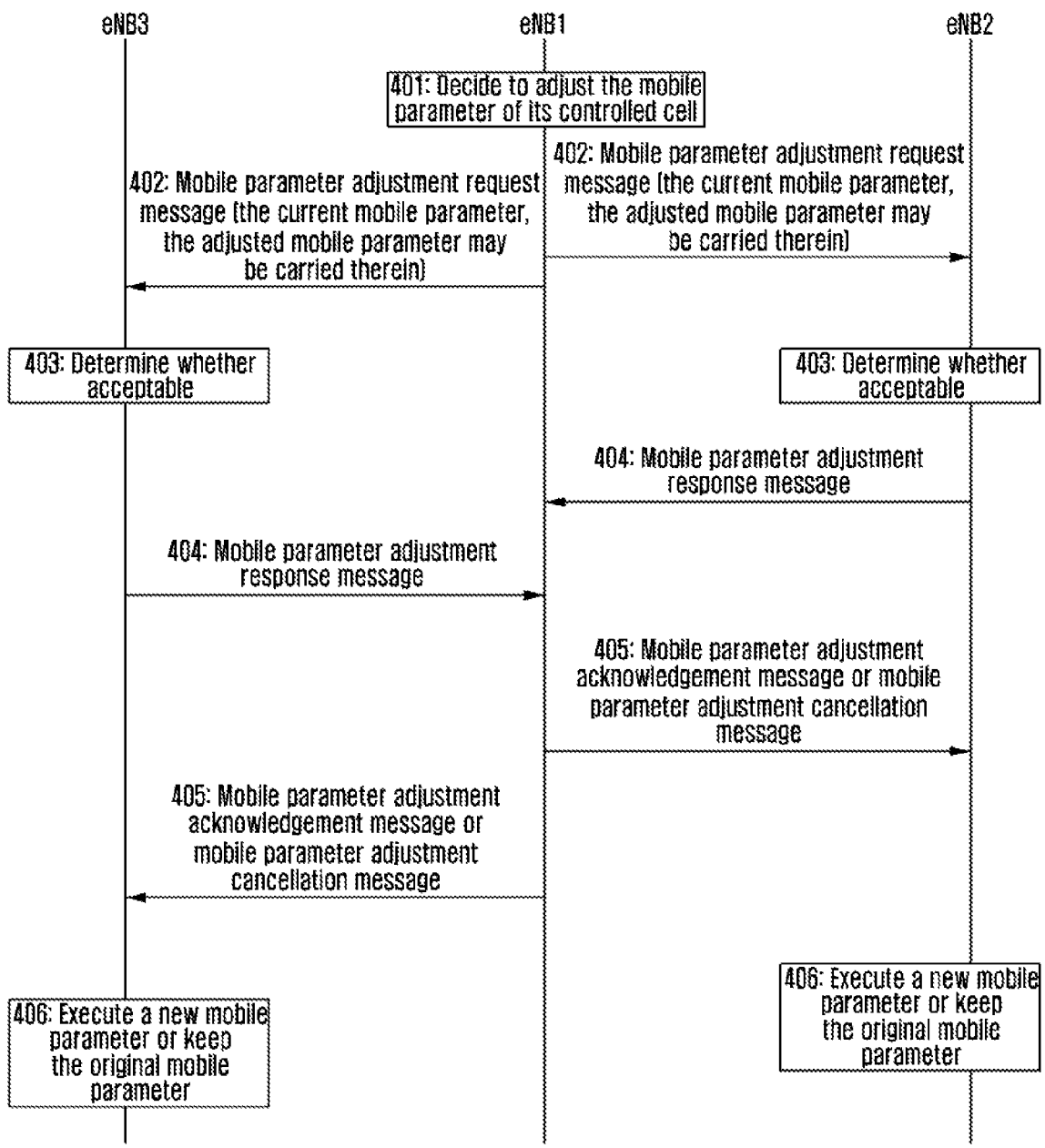
FIG. 4 is a schematic diagram illustrating a method for adjusting a mobile parameter according to an exemplary embodiment of the present invention.

FIG. 4 is a schematic diagram illustrating a method for adjusting a mobile parameter according to the present invention.

Referring to FIG. 4, in step 401, the eNB1 determines to adjust the mobile parameter of its controlled cell.

In this step, the mobile parameter includes a cell switching parameter and a cell re-selection parameter. The procedure as illustrated in FIG. 4 may be executed no matter which of the following the eNB1 decides to adjust: the cell switching parameter, or the cell re-selection parameter, or both the cell switching parameter and the cell re-selection parameter, of its controlled cell.

In step 402, the eNB1 sends a mobile parameter adjustment request message to every eNB that controls a respective one of all the cells subjected to the adjustment. The adjusted mobile parameter is carried in the mobile parameter adjustment request message. Optionally, the current mobile parameter may also be carried in the mobile parameter adjustment request message.

In this step, assume for this example that the eNB2 and the eNB3 are the eNBs that control a respective one of the cells subjected to the adjustment.

In step 403, the eNB2 and the eNB3 determine whether the adjustment of the eNB1 may be accepted.

In this step, the eNB2 and the eNB3 may further determine whether it is required to adjust the mobile parameter for its controlled cell after the adjustment of the eNB1 is accepted.

In step 404, if the adjustment of the eNB1 may be accepted, the eNB2 and the eNB3 respectively return a mobile parameter adjustment acceptance message to the eNB1.

If the adjustment of the eNB1 cannot be accepted, the eNB2 and the eNB3 respectively return a mobile parameter adjustment refusal message to the eNB1 in this step. If the mobile parameter adjustment refusal message is returned, information representing a refusal reason may be further carried in the message, for the eNB1 to perform corresponding processing.

The two functions of mobile parameter adjustment acceptance and mobile parameter adjustment refusal may also be implemented by a single message (a mobile parameter adjustment response message). Corresponding to this method, information representing acceptance or information representing refusal may be contained in the mobile parameter adjustment response message, to notify the eNB1 of either accepting or refusing the mobile parameter adjustment request. In the case of refusal, information representing a refusal reason may be further carried.

In step 405, if both the eNB2 and the eNB3 return mobile parameter adjustment acceptance, the eNB1 adjusts the related mobile parameter, and returns a mobile parameter adjustment acknowledgement message to the eNB2 and the eNB3.

If at least one of the eNB2 and the eNB3 returns mobile parameter adjustment refusal to the eNB1, in this step, the eNB1 does not adjust the related mobile parameter and return a mobile parameter adjustment cancellation message to the eNB2 and the eNB3.

In step 406, after receiving the mobile parameter adjustment acknowledgement message from the eNB1, the eNB2 and the eNB3 respectively replace the related mobile parameter corresponding to the controlled cell of the eNB1 that is stored currently by the adjusted mobile parameter.

If receiving the mobile parameter adjustment cancellation message from the eNB1 in this step, the eNB2 and the eNB3 retain unchanged the mobile parameter stored currently.

At this point, the method for adjusting the mobile parameter according to the present invention is completed.

As can be seen from the above exemplary embodiment, when the UE encounters the RLF in the first cell controlled by the first evolved base station and selects the second cell controlled by the second evolved base station to re-establish a radio link, the authentication is performed for the UE or the cell in which the UE encounters the RLF by sending the authentication information. Thus, even when there are two or more neighbor cells having the same PCI, the cell in which the UE encounters the RLF can be determined correctly, thus enhancing the self-optimization effect, and improving the network performance.

In an exemplary method for adjusting a mobile parameter, the evolved base station that initiates the mobile parameter adjustment performs determination in a collective manner according to the message returned from every relative evolved base station that indicates accepting or refusing the mobile parameter adjustment, and sends the message that indicates adjusting or not the related mobile parameter to every relative evolved base station in a collective manner according the result of the determination. Finally, all evolved base stations adjust or not the related mobile parameter, thus avoiding the problem that the mobile parameters stored in respective evolved base stations are inconsistent with each other, ensuring that a cell adjusts the mobile parameter with all its adjacent cells in a harmonious manner, enhancing the self-optimization effect, and improving the network performance.

While the invention has been shown and described with reference to certain exemplary embodiments thereof, it will be understood by those skilled in the art that various changes in form and details may be made therein without departing from the spirit and the scope of the invention as defined by the appending claims and their equivalents.

What is claimed is:

1. A method for processing a Radio Link Failure (RLF) report, wherein when a User Equipment (UE) encounters an RLF in a first cell controlled by a first evolved base station and selects a second cell controlled by a second evolved base station to re-establish a Radio Resource Connection (RRC), the method comprises:

receiving, by the second evolved base station, an RRC re-establishment request message from the UE, wherein a Physical Cell Identifier (PCI) of the first cell, a Cell Radio Network Temporary Identifier (CRNTI) of the UE in the first cell, and short information of Media Access Control used for data Integrity of signaling messages (short MAC-I) are carried in the RRC re-establishment request message; and sending, by the second evolved base station, the RLF report to at least one evolved base station that controls a corresponding cell, according to the PCI of the first cell, wherein the PCI of the first cell, the CRNTI of the UE in the first cell, an Enhanced Cell Global Identifier (ECGI) of the second cell, and the short MAC-I are carried in the RLF report, wherein the at least one evolved base station selects a UE context according to the PCI of the first cell and the CRNTI of the UE in the first cell, and determines that the selected UE context is correct based on the short MAC-I, and wherein the ECGI of the second cell indicates a cell where radio link re-establishment attempt is made.

2. The method according to claim 1, wherein the at least one evolved base station that receives the RLF report authenticates the UE according to the UE authentication information carried in the RLF report.

3. The method according to claim 1, wherein the second evolved base station sends the RLF report to every evolved base station that respectively controls a corresponding cell, according to the PCI of the first cell.

4. The method according to claim 1, wherein the short MAC-I comprises the 16 least significant bits of a MAC-I, and the MAC-I is obtained by performing a calculation from the identifier of the second cell and a security related parameter of the first cell.

5. A method for processing a Radio Link Failure (RLF) report, wherein when a User Equipment (UE) encounters an RLF in a first cell controlled by a first evolved base station and selects a second cell controlled by a second evolved base station to re-establish a Radio Resource Connection (RRC), the method comprises:

sending, by the UE, an RRC re-establishment request message to the second evolved base station, wherein a Physical Cell Identifier (PCI) of the first cell, a Cell Radio Network Temporary Identifier (CRNTI) of the UE in the first cell, and short information of Media Access Control used for data Integrity of signaling messages (short MAC-I) are carried in the RRC re-establishment request message, wherein the RLF report is sent from the second evolved base station to at least one evolved base station that controls a corresponding cell, according to the PCI of the first cell, wherein the PCI of the first cell, the CRNTI of the UE in the first cell, an Enhanced Cell Global Identifier (ECGI) of the second cell, and the short MAC-I are carried in the RLF report, wherein the PCI of the first cell and the CRNTI of the UE in the first cell is used to select a UE context, and the short MAC-I is used to determine that the selected UE context is correct by the at least one evolved base station, and wherein the ECGI of the second cell indicates a cell where radio link re-establishment attempt is made.

6. The method according to claim 5, wherein the at least one evolved base station that receives the RLF report authenticates the UE according to the UE authentication information carried in the RLF report.

7. The method according to claim 5, wherein the second evolved base station sends the RLF report to every evolved base station that respectively controls a corresponding cell, according to the PCI of the first cell.

8. The method according to claim 5, wherein the short MAC-I comprises the 16 least significant bits of a MAC-I, and the MAC-I is obtained by performing a calculation from the identifier of the second cell and a security related parameter of the first cell.

9. A method for processing a Radio Link Failure (RLF) report, wherein when a User Equipment (UE) encounters an RLF in a first cell controlled by a first evolved base station and selects a second cell controlled by a second evolved base station to re-establish a Radio Resource Connection (RRC), the method comprising:

receiving, by at least one evolved base station, the RLF report from the second evolved base station, wherein a Physical Cell Identifier (PCI) of the first cell, a Cell Radio Network Temporary Identifier (CRNTI) of the UE in the first cell, an Enhanced Cell Global Identifier (ECGI) of the second cell, and a short information of Media Access Control used for data Integrity of signaling messages (short MAC-I) are carried in the RLF report; and selecting, by the at least one evolved base station, a UE context according to the PCI of the first cell and the CRNTI of the UE in the first cell, and determining that the selected UE context is correct based on the short MAC-I, wherein the at least one evolved base station controls a corresponding cell according to the PCI of the first cell, and wherein the ECGI of the second cell indicates a cell where radio link re-establishment attempt is made.

10. The method according to claim 9, wherein the second evolved base station receives an RRC re-establishment request message sent from the UE, wherein the PCI of the first cell, the CRNTI of the UE in the first cell, and the short MAC-I are carried in the RRC re-establishment request message; and wherein the second evolved base station sends the RLF report to the at least one evolved base station that controls a corresponding cell, according to the PCI of the first cell.

11. The method according to claim 10, wherein the short MAC-I comprises the 16 least significant bits of a MAC-I, and the MAC-I is obtained by performing a calculation from the identifier of the second cell and a security related parameter of the first cell.

12. An apparatus for processing a Radio Link Failure (RLF) report, wherein a User Equipment (UE) encounters an RLF in a first cell controlled by a first evolved base station and selects a second cell controlled by a second evolved base station to re-establish a Radio Resource Connection (RRC), the apparatus comprising:

a transceiver configured to perform communication; and
a controller configured to:

control to receive an RRC re-establishment request message from the UE, wherein a Physical Cell Identifier (PCI) of the first cell, a Cell Radio Network Temporary Identifier (CRNTI) of the UE in the first cell, and short information of Media Access Control used for data Integrity of signaling messages (short MAC-I) are carried in the RRC re-establishment request message, generate the RLF report, wherein the PCI of the first cell, the CRNTI of the UE in the first cell, an Enhanced Cell Global Identifier (ECGI) of the second cell and the short MAC-I are carried in the RLF report, and transmit the RLF report to at least one evolved base station that controls a corresponding cell, according to the PCI of the first cell, wherein the PCI of the first cell and the CRNTI of the UE in the first cell is used to select a UE context, and the short MAC-I is used to determine that the selected UE context is correct by the at least one evolved base station, and wherein the ECGI of the second cell indicates a cell where radio link re-establishment attempt is made.

13. The apparatus according to claim 12, wherein the at least one evolved base station receives the RLF report and authenticates the UE according to the short MAC-I carried in the RLF report.

14. The apparatus according to claim 12, wherein the second evolved base station sends the RLF report to every evolved base station that respectively controls a corresponding cell, according to the PCI of the first cell.

15. The apparatus according to claim 13, wherein the short MAC-I comprises the 16 least significant bits of a MAC-I, and the MAC-I is obtained by performing a calculation from the identifier of the second cell and a security related parameter of the first cell.

16. An apparatus for processing a Radio Link Failure (RLF) report, wherein a User Equipment (UE) encounters an RLF in a first cell controlled by a first evolved base station and selects a second cell controlled by a second evolved base station to re-establish a Radio Resource Connection (RRC), the apparatus comprising:

a transceiver configured to perform communication; and
a controller configured to:

control to receive the RLF report, wherein the PCI of the first cell, the CRNTI of the UE in the first cell, an Enhanced Cell Global Identifier (ECGI) of the second cell and the short MAC-I are carried in the RLF report, authenticate the UE according to the short MAC-I carried in the RLF report, select a UE context according to the PCI of the first cell and the CRNTI of the UE in the first cell, and determine that the selected UE context is correct based on the short MAC-I, wherein the ECGI of the second cell indicates a cell where radio link re-establishment attempt is made.

17. An apparatus for processing a Radio Link Failure (RLF) report, wherein a User Equipment (UE) encounters an RLF in a first cell controlled by a first evolved base station and selects a second cell controlled by a second evolved base station to re-establish a Radio Resource Connection (RRC), the apparatus comprising:

a transceiver configured to perform communication; and
a controller configured to control to send an RRC re-establishment request message to the second evolved base station, wherein a Physical Cell Identifier (PCI) of the first cell, a Cell Radio Network Temporary Identifier (CRNTI) of the UE in the first cell, and short information of Media Access Control used for data Integrity of signaling messages (short MAC-I) are carried in the RRC re-establishment request message, wherein the RLF report is sent from the second evolved base station to at least one evolved base station that controls a corresponding cell, according to the PCI of the first cell, wherein the PCI of the first cell, the CRNTI of the UE in the first cell, an Enhanced Cell Global Identifier (ECGI) of the second cell, and the short MAC-I are carried in the RLF report, wherein the PCI of the first cell and the CRNTI of the UE in the first cell is used to select a UE context, and the short MAC-I is used to determine that the selected UE context is correct by the at least one evolved base station, and wherein the ECGI of the second cell indicates a cell where radio link re-establishment attempt is made.

* * * * *